United States Patent [19]

Sutherland

[11] 3,889,107

[45] June 10, 1975

[54] SYSTEM OF POLYGON SORTING BY DISSECTION

[75] Inventor: Ivan E. Sutherland, Salt Lake City, Utah

[73] Assignee: Evans & Sutherland Computer Corporation, Salt Lake City, Utah

[22] Filed: Sept. 27, 1973

[21] Appl. No.: 401,479

Related U.S. Application Data

[63] Continuation-in-part of Ser. No. 298,084, Oct. 16, 1972, Pat. No. 3,816,726.

[52] U.S. Cl. ................................ 235/152; 235/151

[51] Int. Cl. ........................ G06f 7/38; G06f 15/20

[58] Field of Search ........ 235/152, 151; 340/324 A, 340/324 R, 172.5

[56] References Cited

UNITED STATES PATENTS

| | | | |
|---|---|---|---|
| 3,602,702 | 9/1971 | Warnock | 235/151 |
| 3,665,408 | 5/1972 | Erdahl et al. | 340/172.5 |
| 3,700,792 | 10/1972 | Harrison et al. | 340/324 A |
| 3,736,564 | 5/1973 | Watkins | 340/172.5 |
| 3,816,726 | 6/1974 | Sutherland et al. | 235/152 |

*Primary Examiner*—David H. Malzahn
*Attorney, Agent, or Firm*—Nilsson, Robbins, Bissell, Dalgarn & Berliner

[57] ABSTRACT

A polygon-dissection structure is disclosed incorporated in a system for processing geometric data, e.g. data representing three-dimensional polygons, as by subdividing such polygons to accomplish sorting of the data. The system operates to divide a working volume, e.g. a perspective pyramid, into successively-smaller subvolumes. The separating planes are placed at arbitrary angles to coincide with the edges and surfaces of polygons that define objects to be represented. Polygons which straddle separating planes are dissected into two parts which are thereafter treated separately. Dissection by the system results in simplification in accounting for the polygons in relation to specific subvolumes. The system can be applied to the detection of those polygons which hide others thereby enabling a solution to the hidden-surface problem. Additionally, the system affords a simple mechanism for resolving shadowed portions of polygons as well as portions of polygons obstructed by semi-transparent surfaces and for explicitly computing and displaying implied lines of intersections existing between two inter-penetrating polygons. Alternatively, the system provides an efficient way of detecting if any or a multiplicity of polyhedra solids interpenetrate.

9 Claims, 8 Drawing Figures

SYSTEM OF POLYGON SORTING BY DISSECTION

BACKGROUND AND SUMMARY OF THE INVENTION

This is a continuation-in-part of copending application Ser. No. 298,084, now U.S. Pat. No. 3,816,726, filed Oct. 16, 1972, and directed to an invention by Ivan E. Sutherland and Gary W. Hodgman.

In recent years substantial progress has been made in the art of computer graphics. One approach relating to the presentation of perspective views has been to quantize objects into elemental surfaces, e.g. polygons, of the object which can be represented by signals that are manipulated to accomplish desired projections on a view plane and in accordance with a desired orientation of the object. Prior work has included the composition of pictures encompassing a plurality of individual objects. Additionally, composite pictures or scenes have been depicted on several adjacent viewing devices to provide a panoramic view. For such systems, a need exists for an effective unit to sever, or dissect surface-defining polygons along border lines between separate viewing devices. Of course, the dissection is performed by processing data to accomplish a dissection in the picture presentation.

Another problem encountered in the field of computer graphics has been termed the "hidden-surface problem". As objects are pictured in various positions and from various viewpoints, definition and realism are considerably improved by eliminating those surfaces which would be obstructed by other surfaces nearer the viewpoint. One approach to solving the hidden-surface problem, along with certain other computer graphics problems, has involved the subdivision of surfaces. Generally, subdivision systems operate by dividing the display screen into successively smaller areas to progressively reduce the complexity of the problem requiring solution. The progressive subdivision terminates upon attaining either of two conditions. Either an area is defined, the content of which is sufficiently simple for the system to present or the defined area is so small that any representation of it is acceptable. For example, in the latter case, the area may have been reduced to a size that is smaller than the definitive capability of a display apparatus, e.g. dimensions of less than one five hundred and twenty-five hundredths of the screen height may be ignored in a commercial television display. A detailed description of a subdivision system appears in U.S. Pat. No. 3,602,702, granted Aug. 31, 1971, to John E. Warnock. Pertient descriptive material on the system is also provided in a book entitled "PRINCIPLES OF INTERACTIVE COMPUTER GRAPHICS" by William M. Newman and Robert F. Sproull, published 1973 by McGraw-Hill Book Company, beginning on page 297.

Somewhat apart from disclosures of the Warnock system, subdivision can be considered as a kind of sorting process. Specifically, given a collection of polygons, the subdivision process separates them into groups on the basis of geometric area classifications. Consequently, it is suggested that subdivision systems may offer the most efficient basis for processing data in this field. However, unfortunately, the process of sorting polygons is complicated by the fact that because they have finite areas, no unique sorting order is defined. A sorting order can be imposed only by sorting some one point on each polygon. For example, if a plane of subdivision is selected and a list of polygons are divided according to the side of the plane upon which they lie, they are inevitably polygons which straddle the cutting plane. These polygons must be considered to belong partly on each side of the cutting plane. Various techniques have been proposed for circumventing the difficulty presented by polygons which straddle the cutting plane. One proposal, as described in the above-referenced Warnock patent, involves including the straddling polygons in both lists of subdivided data even though doing so listed polygons which extended outside the region of interest. Thus, in spite of the promising nature of subdivision techniques to sort computer-graphics data, a need has continued to exist for a system which avoids the necessity of placing a single polygon on two lists during the subdivision process. Also, a need has continued to exist for a system that is capable of subdividing effectively by using a smaller number of windows, i.e. areas on the display screen. Finally, a need also has continued to exist for a system to effectively process the display data to solve such problems as the hidden-surface problem.

In the above-referenced copending case, a system is described for clipping polygons, e.g. defined surfaces, to eliminate those portions of objects which lie outside a specified field of vision. In accordance herewith, it has been discovered that the clipping system referred to may be adapted to be effectively utilized for dissecting polygons and is adaptable for use in a subdivision system, thereby affording a new approach to polygon sorting. Specifically, any polygon which straddles a plane of subdivision is dissected into two parts which are thereafter treated separately. Relating the data to the display, each part of the dissected polygon lies entirely on its proper side of the cutting plane, avoiding the need to consider polygons (or portions thereof) which extend outside the field of view (volume of interest). Each part of a severed polygon has a newly-generated edge which is marked as a created edge and thus distinguished from the original polygon edges in subsequent processing. Although the development of two polygons increases the number of polygons for the next level of subdivision, the process ultimately involves less work than considering the original polygon twice, because the new polygons are likely to have fewer vertices than the original polygon.

In using the clipping system referred to above, it is emphasized that polygons may be cut along any plane with equal ease and as a result dissection planes need not be aligned with the coordinate axes. Such freedom in defining dissection planes enables subdivisions along the edges of planes defining objects and may avoid the necessity for detailed subdivision to the extent contemplated in the system of the referenced Warnock patent. Also, in display of one polygon penetrating another, dissection can be made along the line of intersection to separate a potentially visible part from a potentially invisible part.

As still another consideration stemming from the above discovery, it is significant that the polygon dissection system (implemented to cut polygons) results in output polygons that do not extend outside the boundaries of the volume of interest. When viewing such a volume, any polygon, which has no edges other than those that coincide with the edges of the volume, is either degenerate or covers the viewing area entirely. As a result, the previous difficulty of detecting polygons which surround a viewing volume or window ("surrounders") is simply solved. Also, a condition involving a collection of polygons defining an object and surrounding a window can be detected rather easily. Consequently, a mechanism is provided for detecting the situation in which several polygons collectively hide or obscure some other object which can, therefore, be discarded from the picture.

The system of the present invention, when applied to subdivision systems, may be thought of as working in ever-decreasing convex volumes of space. For example, the initial subdivision may be considered as severing a pyramidal volume representative of the field of vision. In that regard, prior subdivision systems have generally been described in terms of those areas of the screen in which they deal. However, relating the present system to volumes accommodates dissection planes that lie somewhat parallel to the screen, as in treating the hidden-surface problem.

Given a volume of space containing a collection of polygons, the present system will dissect the volume into two sub-volumes with an initial cutting plane that is generally defined to extend between the viewpoint and an object. If the initial volume is convex, both of the new volumes also will be convex. If no polygons protrude from the initial volume, neither will they from the sub-volumes, because polygons which straddle the cutting plane will be dissected into two separate parts which will thereafter be treated as separate. If the initial polygons within the volume are all convex, the polygons of the output sets also will be convex. If some of the initial polygons are not convex, the output polygons will be made to tend toward convexity by appropriate corrections in the dissection process.

The detailed operation of the system is determined substantially by the form of the data and the choice of the cutting planes, along with the disposition of the sublists and the choice of the termination criteria. Typically, cutting planes are chosen to match object details and sublists are repeatedly reduced until they contain but a single polygon. Just as the efficiency of sorting systems is determined by careful estimations, so the efficiency of this system is determined by the careful selection of cutting planes. Criteria are presented herein for selecting cutting planes; however, alternative proposals will also be apparent.

BRIEF DESCRIPTION OF THE DRAWINGS

In the drawings, which constitute a part of this specification, exemplary embodiments exhibiting various objectives and features hereof are set forth, specifically.

and

Figure 7A:
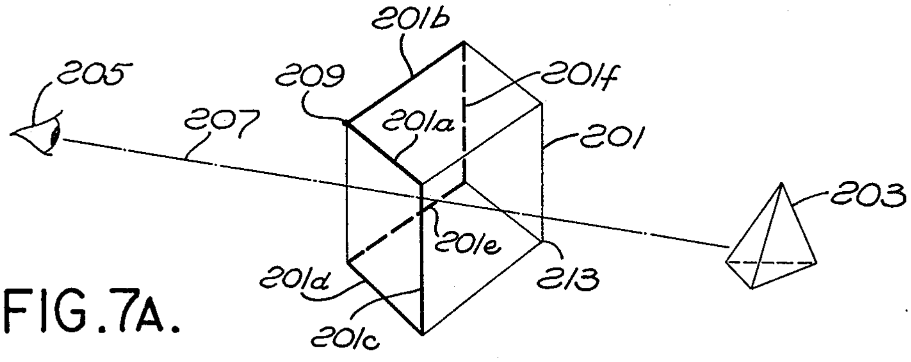
Figure 7B:
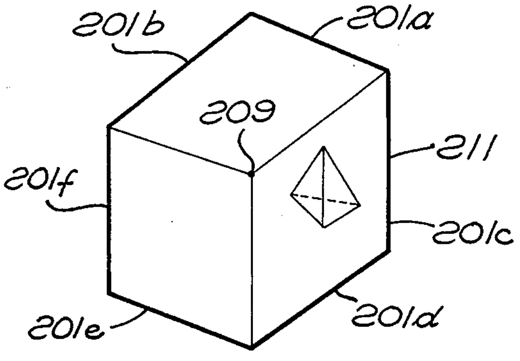
Figure 6:
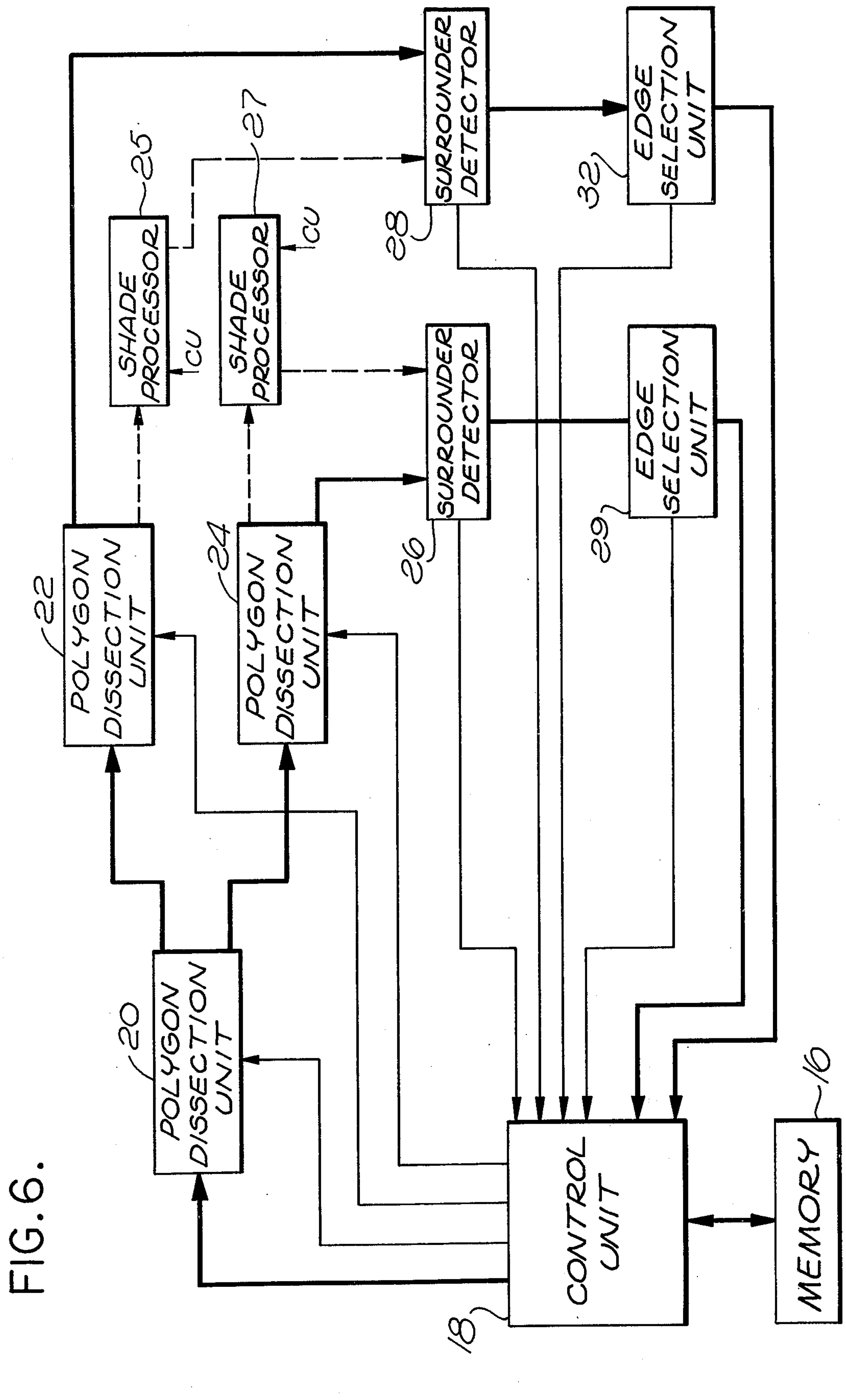
FIG. 6 is a block diagram of an illustrative computer graphic system in accordance with the present invention.

FIGS. 7a and 7b are graphic representation illustrative of the operation of the system of FIG. 6 to process computer-graphics data.

DESCRIPTION OF THE ILLUSTRATIVE EMBODIMENTS

As required, detailed illustrative embodiments of the invention are disclosed herein. The embodiments merely exemplify the invention which may, of course, be constructed in various other forms, some of which may be quite different from the disclosed illustrative embodiments. However, specific structural and functional details disclosed herein are merely representative and in that regard provide a basis for the claims herein which define the scope of the present invention.

As disclosed in detail herein, the system of the present invention is useful in various applications to process geometric data, e.g. data representative of surfaces which are in turn definitive of three-dimensional objects. Recognizing that the surfaces represented are to be moved within a field of vision so that different views are presented, the system of the present invention may be employed variously to effectively process the data representing the surfaces for actuating a display apparatus to accomplish desired display as on a two-dimensional screen. In a readily-apparent application, the dissecting unit can be employed for computing perspective pictures simultaneously for two adjacent or related displays. Less apparent applications are considered in detail below; however, reference now will be made to FIG. 1 for consideration of the dissection of surfaces.

As illustrated, a truncated pyramidal volume V is represented to indicate a field of vision for a viewer represented by an eye E and located at a viewpoint. Generally, a graphic display is provided by representing objects that lie in various positional relationships within the volume V so as to provide a composite two-dimensional display on a screen represented by a surface S. The objects are represented by data which define surfaces, and the data is processed, as for example, to determine those surfaces and portions of surfaces which are obscured and should be eliminated. As illustrated (FIG. 1) a pair of triangular, plane forms are represented as polygons 10 and 12 in the volume V and are in inter-penetrating relationship. The data definitive of such an arrangement might simply define surfaces of the two triangular polygons 10 and 12, specifying their vertices in terms of the coordinates X, Y and Z as indicated. Processing the data to provide an effective presentation involves eliminating the portion of the surface of polygon 10 which is obscured by the surface of the polygon 12. Perhaps at the present stage it is comprehensible that in accomplishing such processing distinct advantages result from subdividing the surface of the polygon 10 along the plane of the triangular polygon 12. That is, by subdividing the surface of the polygon 10 along the plane of the polygon 12, the penetrating, visible part 10*a* of the polygon 10 is defined. Thus, dissection in accordance herewith may be appreciated as an effective system for processing data.

In accordance with various techniques, objects can be defined by surfaces, e.g. planar polygons that may be in turn variously represented in terms of electrical signals utilizing different formats. However, as generally disclosed herein, a polygon is represented by a series of vertices which define the corner or terminal points of the polygon. For example, the polygon 10 (FIG. 1) is defined by the vertices P1, P2, and P3. The operation of dissecting the polygon 10 along the plane of the polygon 12 involves additional points at the intersections.

Figure 2:
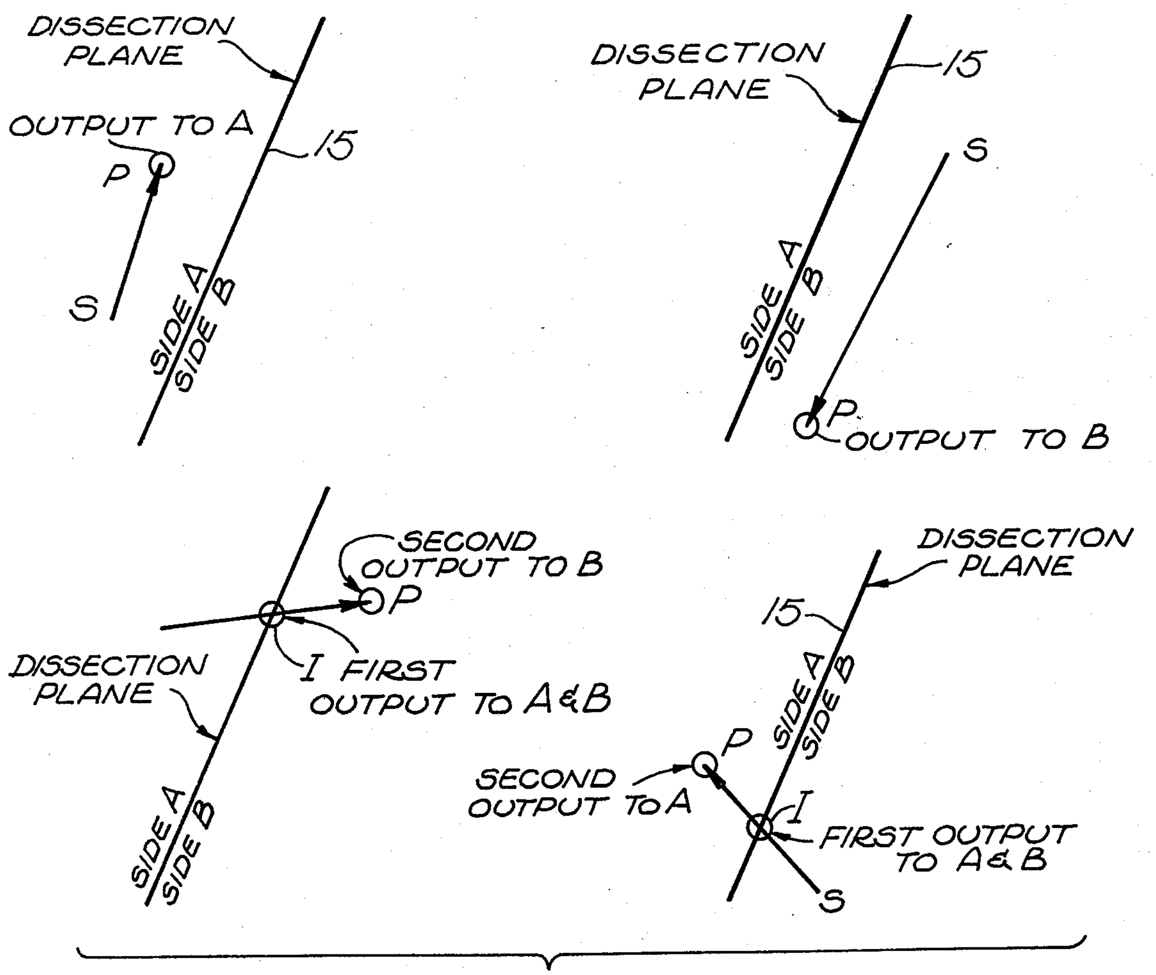
FIG. 2 is a group of graphic representations illustrative of certain operational phases of a system in accordance with the present invention to effectively dissect polygon data.

Generally, a polygon is dissected, or more properly the representative data is processed to reflect a dissection, in accordance herewith by treating relationships that exist for a line extending between two vertices and the plane of dissection. In fact, four basic situations are possible which are depicted in FIG. 2 in relation to a surface edge and a dissection plane. These situations will now be considered in detail. An edge (defined between a pair of vertices) may be entirely on one or the other side of a dissection plane, or the edge may cross the dissection plane from one side to the other. As these possibilities are illustrated in FIG. 2, a line 15 indicates the dissection plane, while the edge is indicated to extend from a "saved" or prior vertex S and extend to a fresh or present vertex P. In each of the FIGS. 2*a*, 2*b*, 2*c* and 2*d*, the plane 15 separates the sides A and sides B with the result that those portions of a polygon on the side A are defined separately from those portions of the polygon lying on side B. In effect, a divided polygon is dissected into separate polygons by the plane 15.

To illustrate the possible situations, a polygonal edge, as indicated above, is defined in each case by the vertices S and P, e.g. vertex S being saved or registered and vertex P being the "present" vertex. In the initial case of FIG. 2a, the edge defined by the vertices S and P lies entirely on side A of the plane 15. Accordingly, no severing or dissection operation is performed. Rather, the vertices S and P continue to exist definitive of an edge in the polygon which will be defined on side A of the plane 15. In effect, the vertex P becomes a new saved vertex S (for the next test) and is also provided as an output. Thus, polygon edges that do not cross the dissection plane are represented by data that is unchanged.

In a situation as depicted in FIG. 2b, an edge defined between the vertices S and P lies entirely on side B of the plane indicated by line 15. As a consequence, the situation is the same as that depicted in FIG. 2*a* except for the fact that the vertices are definitive of an edge of a polygon that is on side B.

The situation depicted in FIG. 2c illustrates an edge of a polygon which extends from side A of the plane 15 to side B, again from vertex S to vertex P. As a consequence, the portion of the edge on side A of the plane is severed from the portion on side B. Of course, in processing a complete polygon each portion is integrated with a portion of the original polygon to define fresh polygons. The vertex S (on side A) in combination with an intersection point I defines a new edge S-I defining a portion of a fresh polygon on side A of the plane 15. The point I also becomes a vertex in combination with the vertex P to define an edge I-P of a fresh polygon which will be defined on the side B of the plane 15.

The situation depicted in FIG. 2d is similar to that of 2c, except that the edge moves from a vertex S that is located on side B to a vertex P that is located on side A. Thus, edges defined by pairs of vertices in each of the possible situations in relation to a dissection plane are treated with the following results in the representative data. Polygons that are remote from the plane 15 are left whole but separated into two groups relative to the dissection plane. Polygons that cross the plane are dissected or divided into a plurality of polygons defined to lie entirely on side A or side B and are so classified.

Figure 3:
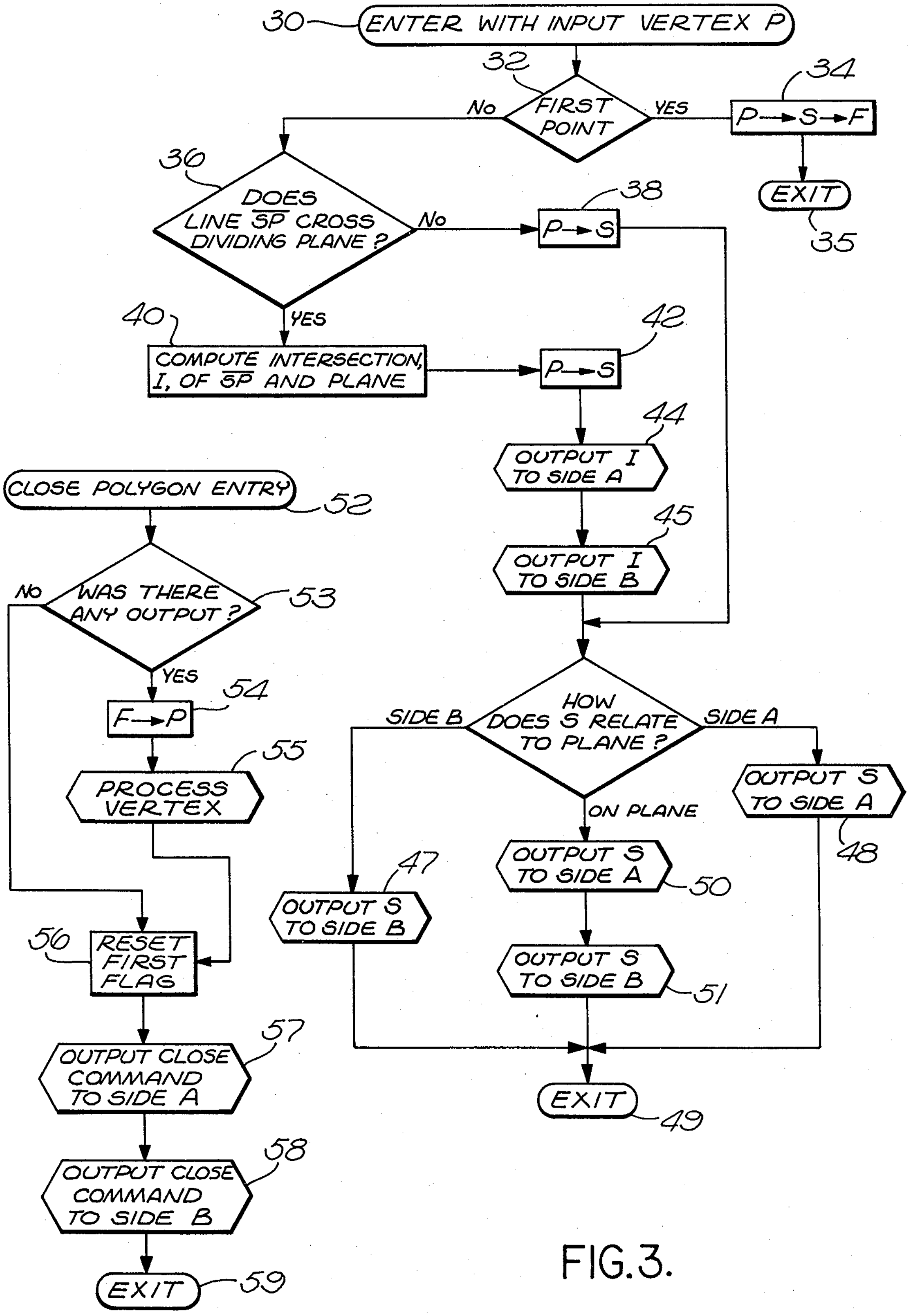
FIG. 3 is a flow diagram representative of an illustrative dissecting process in accordance with the present invention.

Relating the situations as described above to dissecting the polygon 10 (FIG. 1), it is to be noted that the edge defined by the vertices P1 and P2 is similar to the situation depicted in FIG. 2d. As a consequence, the initial step involves defining a new edge P1-I1. Also, in crossing the dissection plane, an edge is defined on the upper side by the vertices I1-P2. The next operation involves treating the edge P2-P3 in a return crossing (depicted in FIG. 2c) with the result that the edge P2-I2 is defined on the upper side A and I2-P3 is defined on the lower side B. Closing the resulting polygons provides: P1-I1-I2-P3 and I1-P2-I2. The system will now be considered in greater detail with reference to FIG. 3 illustrating the process in steps of processing data to accomplish the geometric results explained above.

The initial step of the repeating process involves registering data that is indicative of the vertex P, as indicated by the block 30. Generally, the vertex will be represented in terms of position coordinates X, Y, and Z. Additionally, as considered below, other elements may also be involved as to indicate color, tone, relative position considerations and identifier flags.

The information or data defining the vertex P is next considered in a decisional stage indicated by the block 32 to determine whether or not the represented vertex P is the first point of polygon. The first point can be flagged, or alternatively as disclosed in the structure embodied below, the last point can be flagged to simply indicate that the next-following point is the first point of the next polygon in the data sequence.

If the vertex P is a first point, the representative data is registered in an S register (for the vertex S) and additionally in an F register (for the first point F). On completion of the registration process as indicated by the block 34, an exit stage is attained (block 35).

Should the current vertex P not be the first point of a polygon, the process moves from the test stage (block 32) to another decisional stage indicated by a block 36. Specifically, the logic test queries whether the vertices P and S lie on opposite sides of a plane. Should the query result in a negative indication, the data representative of the vertex P is registered as the value S as indicated by the block 38 and an intermediate stage is completed. However, if an affirmative result occurs from the block 36, the system computes the intersection I of the vector defined between the vertices S and P with the dissection plane, as indicated by the block 40. The intersection I is represented by developed data indicative of that point, which now becomes a new vertex. Upon completing the computation, the data representative of the vertex P is transferred to become the vertex S as indicated by the box 42. Subsequently, the vertex I is provided as an output for both the polygons that are being developed on sides A and B, as indicated by the boxes 44 and 45 after which an intermediate stage is attained.

From the intermediate stage, the process enters a step (represented by a box 46) which queries the manner in which the fresh vertex S relates to the dissection plane. If the determination is that the vertex S is on the side B, the subsequent step is to provide an output of the vertex S for the side B as indicated by the box 47. Conversely, if the vertex S is on the side A, the output is to side A as indicated by the box 48. In either case, the steps represented by the boxes 47 and 48 lead to an exit from the routine indicated by the box 49.

As an alternative to the vertex S being on either side of the dissection plane, a third possibility is that it coincides with the plane. In that event, the process is to output the vertex S to both sides A and B as indicated by the blocks 50 and 51. Thereafter, the process is again complete as indicated by exit block 49. Thus, each entry of data representative of a fresh vertex P may result in: (1) an output vertex to side A; (2) an output vertex to side B; or (3) an output representative of a vertex to both sides A and B, with the result that vertices are segregated into two lists definitive, respectively, of polygons on either side of the dissection plane.

Figure 1:
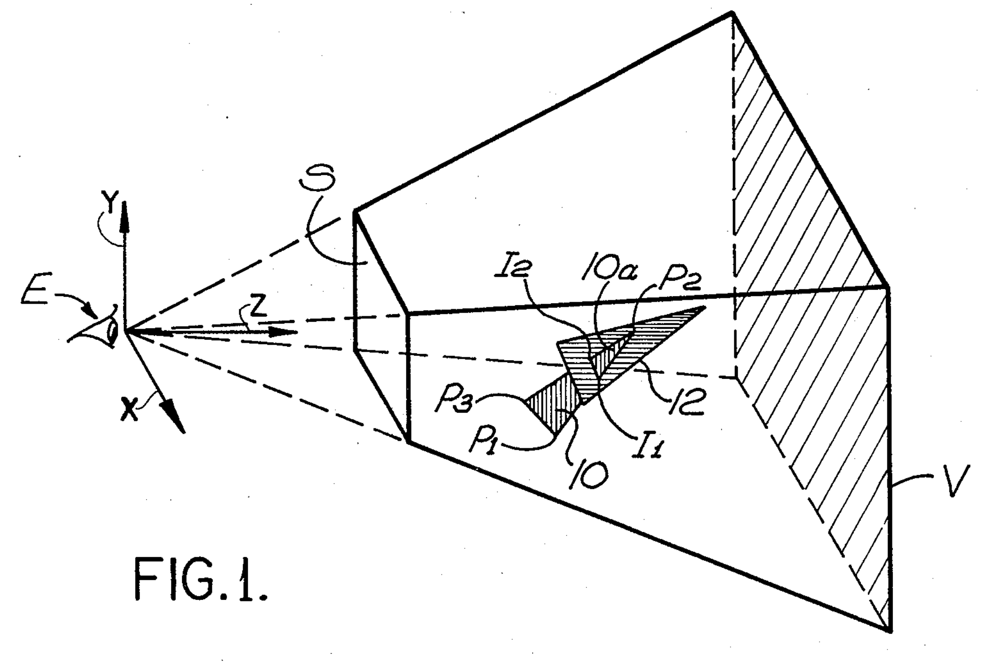
FIG. 1 is a graphic representation illustrative of certain aspects of the system of subdividing a volume in accordance with the present invention.

As indicated above in relation to the triangular polygon 10 of FIG. 1, it is important that after the last vertex defining a polygon has been received, the system initiates a process to close the newly-defined polygons. The closing process is initiated at the step of box 52 (FIG. 3). As a condition to closing there must have been an output while processing the polygon. That is, at least one output vertex must have been defined to indicate a location with reference to the dissection plane. A query to resolve the question is provided by the step represented by the box 53, i.e. was there an output? An affirmative indication results in the vertex contained in the first register F (vertex F) being presented as the vertex P, as indicated by the box 54. Thereafter, a series of steps, represented by the box 55 proceeds to repeat the process of steps represented by the boxes 30 through 49 as described above, as though the first vertex F were a newly-presented vertex P. Outputs are provided accordingly. Thereafter the process proceeds to a step indicated by a box 56 which step also occurs upon a negative response to the test for an output. The step of the box 56 is to reset the flag indicative of the first point and proceed with the computations to close the polygons on sides A and B as designated by the boxes 57 and 58 after which the process is concluded as indicated by the exit box 59.

Figure 4:
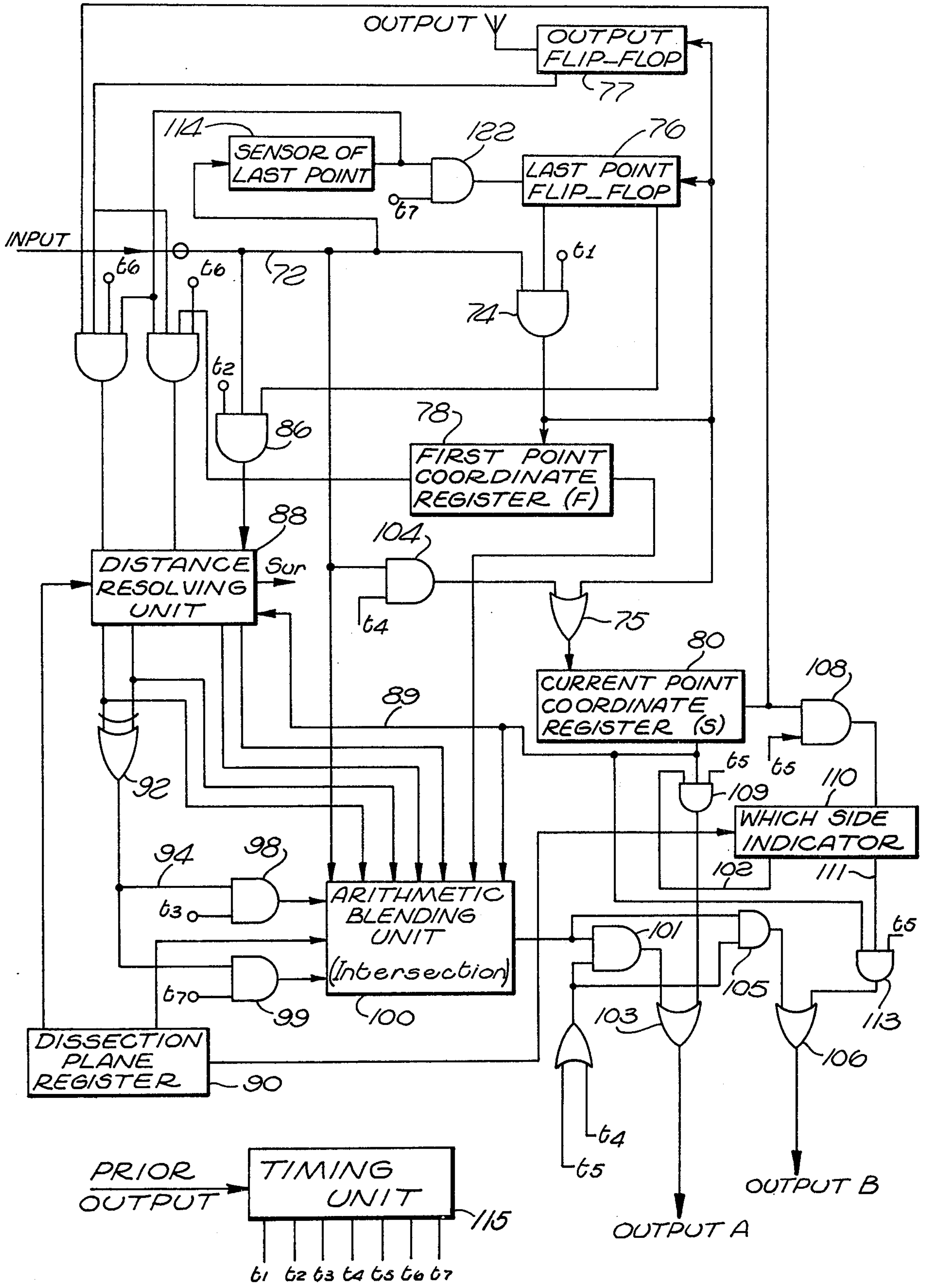
FIG. 4 is a block diagram of a dissecting unit constructed in accordance with the principles of the present invention.

The process as described above is embodied in an illustrative polygon-dissection unit which is shown in FIG. 4. Generally, the lines or transfer paths indicated may comprise multi-conductor cables for parallel-information transfer or, alternatively, they may involve sequential signal transfer paths, both forms being very well known in the art. Such a path receives signals representative of the input vertices P1, P2,---, and is designated in FIG. 4 as path 72 (near top). As indicated, the data represented may be in the form of homogeneous coordinates. Specifically, each vertex is represented by digital signals to manifest: X, Y, Z, W, C, I, and F.

In such a representation, the specific representations are:

X is the horizontal displacement of the vertex from the viewing axis;

Y is the vertical offset from the viewing axis;

Z is the depth from the near plane or from the observer;

W is the fourth dimension value as employed in the matrix transformations (optional);

C may or may not exist and indicates a value of color, e.g. tone, opacity, intensity, etc.

I may or may not exist and indicates a value of intensity; and

F may designate flags.

The representative data for a vertex, as considered above, is received through the path 72 for application to several separate structures which will be independently considered. First, the path 72 is connected to an "and" logic gate 74 (upper right) which may take the form of a gang gate in the event that the path 72 comprises a cable of individual conductors. The gate 74 is operative during an interval of time manifest by a signal t1, which constitutes the initial operating interval of the structure. Additionally, the gate 74 is connected to receive an input from a flip flop 76 which is set (explained below) by the last vertex of a polygon. Consequently, on receipt of the first vertex of a polygon, the gate 74 is qualified and supplies the received vertex signals (definitive of P) through the gate 74 to be registered in a pair of digital registers 78 (directly) and register 80 (through "or" gate 75, right center).

In accordance with the designations adopted above, the register 78 contains the first point and is designated F while the register 80 receives the saved vertex and is designated S. In summary, the gate 74 functions to place the first vertex (point data P) in the registers 78 and 80. Also, with the qualification of the gate 74, a reset path is actuated back to the flip flop 76 and a flip flop 77. Resetting the flip flop 76 inhibits the gate 74 until the last polygon is processed when the flip flop 76 is again set.

After the first vertex has been received and registered, the signals representative of data defining the second vertex (and subsequent) are not permitted to clear the gate 74 (as the flip flop 76 is reset); however, such sets of data signals are also applied to an "and" logic gate 86 (center left) which may be similar to the gate 74 (as each of the other "and" gates herein, utilizing various well known structures). The gate 86 is qualified during the interval of timing signal t2 when the flip flop 76 is reset. Accordingly, data signals for each vertex, after the initial set, is supplied to a unit 88 along with signals representative of vertex S from the register 80 via path 89.

The unit 88 is a translator or distance-resolving structure that translates the signals to a form specifying the vertices P and S, referenced to the dissection plane, i.e. plane of side A, rather than in absolute coordinates. Various forms of such structures are well known as disclosed in the parent case. Additionally, the unit 88 provides a binary signal Sur, the application of which is described in complete detail below. However, it is here noteworthy that the signal Sur indicates the fact that the edge between the vertices S and P lies on the dissection plane. Essentially, the unit simply provides a high signal Sur when the newly referenced values of S and P are on the dissection plane.

The distance-resolving unit 88 receives signals representative of the dissection plane (defining the reference) from a register 90 (lower left) and, accordingly, simply converts distances from absolute coordinates to distances that are related to the dissection plane. The sign signals of the representations that specify the distances in relation to the dissection plane 15 are indicative of whether or not the points designated by P and S are on the same side of the plane. The representations are also employed to compute the intersection I of the vector between vertex points S and P with the plane 15 as an output.

Preliminarily, the query is directed to determine whether or not points P and S are on the same side of the plane 15 (either side A or side B). That is, if the signs of the points P and S are identical, then both are either above or below the plane 15. Accordingly, the sign bits of the signal representations for P and S are applied to an exclusive "or" gate 92 having an output to line 94 which is high if the two points are on opposite sides of the plane.

If the points S and P are on opposite sides of the dissection plane 15 (output to line 94 high), then the intersection I is to be computed. The command for such a computation is provided by a binary signal from the line 94 passing to a pair of "and" gates 98 and 99, the gate 98 being qualified by a timing signal t3. Essentially, qualification of the gate 98 commands an arithmetic blending unit 100 to compute values defining the intersection I in the plane of concern. In that regard, the unit 100 receives signals representative of the input vertex point (P) from the path 72, as well as the contents of the register 80, i.e. vertex S. Also in addition to locating the intersection I, color and intensity blending may be performed in relation to the signals C and I if employed.

It is to be noted that various structures may be employed to compute the intersection I, one of which is disclosed in U.S. Pat. No. 3,639,736 and another is disclosed in the parent case hereto. The signals (representative of the intersection I) pass from the arithmetic blending unit 100 through a pair of "and" gates 101 and 105 (during the interval of t4) and a pair of "or" gates 103 and 106 to the outputs of side A and side B.

Regardless of whether or not the vertices S and P are on the same side of the plane 15, and whether or not the intersection I is computed, in due course, the signals definitive of the vertex P are registered in the S register 80. That registration occurs during the interval of t4 through an and gate 104 (center) and an or gate 75.

After freshly loading the save register 80 (vertex S), the next operation involves determining the side of the dissection plane on which the point is located. That test is determined by the distance-resolving unit 88 (center left) in cooperation with the exclusive or gate 92. During the interval of timing signal t5, data from the register 80 is supplied through an and gate 108 to a side indicator 110, along with data from the plane register 90. The indicator 110 comprises a binary to provide a high signal to the output line 102 in the event that the point defined by the contents of the save register 80 is on the side A of the plane. Conversely, a signal from the indicator on line 111 qualifies an and gate 113 for providing an output signal through the or gate 106 from the register 80, to indicate an output on the B side. If the point is on the plane, both lines 102 and 111 will be functional. The outputs are applied to a timing unit 115 to initiate the operation of the next sequence.

The structure as depicted in FIG. 4 is thus operative through a number of points P1, P2, P3,---- in sequence to perform dissection operations as explained above. Upon arrival of data specifying the last point of a polygon (providing that an output has occurred) the closing process is actuated. Specifically, the last point of a polygon bears a flag which is detected by a sensor 114 (center top) which partially qualifies a pair of and gates 116 and 118. These gates are fully qualified if an output flip flop 77 was set by an occurring output, whereupon the gates pass data from the registers 78 and 80 (F and S) for application to the distance-resolving unit 88 for determination of whether or not the first point (contained in the first register 78) and the saved point (contained in the save register 80) are on the same side of the dissection plane. Thus, the closure operation is similar to those described above, however, involves the first and last vertices.

During the interval of timing period t6, the contents of the registers 78 and 80 are applied to the distance-resolving unit 88. If the points are determined to be on opposed sides of the plane, as manifest by the exclusive or gate 92, the intersection is computed as previously explained by the blending unit 100 to provide signals definitive of an intersection at the output during t7, through the gate 101 and 105. In any event, an output close command occurs by qualification of an and gate 122 (top center) which sets the flip flop 76. Thus, the vertices are closed to define polygons which lie on the opposite sides of the plane. As a result, data representative of objects by polygons is processed into subdivisions, defined by dissection planes. Although the significance of such subdivisions for certain situations, e.g. splitting a display, may be apparent, the present invention contemplates a utilization of the subdividing system to solve the hidden-line, and other problems as will now be treated in detail.

Figure 5:
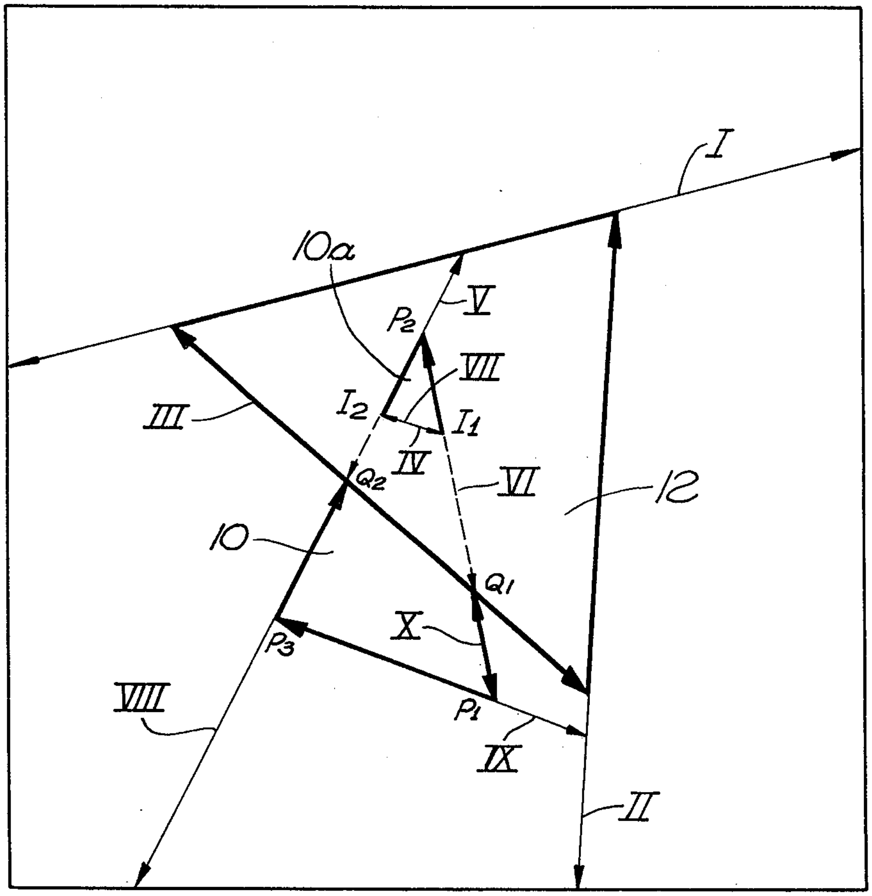
FIG. 5 is another graphic representation illustrative of certain operational phases of a system according to the present invention.

Although the present invention generally involves treating volumes, as within the volume V (FIG. 1), the sorting technique is principally related to subdividing a screen S along projections of polygon edges. Such operation amounts to dividing a working volume along infinite planes defined by the eye E and the edges of polygons. Such subdivisions tend to break up the screen S into areas in which a limited number of polygons appear. That subdivision process bears some relationship to the divisions disclosed in the above-referenced Warnock U.S. Pat. No. (3,602,702); however, an immediate and obvious distinction resides in the fact that the sub-areas involved in the present system are not rectangular as in the referenced system. For example, the sub-areas or "windows" as defined on a screen in accordance with the present invention are illustrated in FIG. 5, showing the polygons 10 and 12 (heavy lines) as projected on the screen S. The individual subdivisions are indicated by the lines bearing Roman numberals I through X, designating the cutting order.

It is apparent from FIG. 5 that a portion of the polygon 10 is obscured by the polygon 12, as considered above with reference to FIG. 1. The problems of treating the total data for display (as to resolve hidden lines) can be simplified by treating selected windows. In accordance with the present invention, such windows are defined to have boundaries that coincide to polygon edges. That is, the detection of hidden material in accordance with the system of the present invention involves testing polygons in relation to windows for the presence of "surrounders." A surrounder is a polygon that coincides to a window and is easy to detect because any polygon with no edges, other than those which coincide with the edges of the window, must either be a surrounder or a degenerate. As illustrated in FIG. 1, when a surrounder is detected, e.g. the polygon 12, coinciding to a window, the window in question is divided along the plane of the surrounder and any material behind the surrounder (obscured portion of form 10) is discarded as obstructed by the surrounder.

In view of the above preliminary considerations, reference will now be made to FIG. 6 for an explanation of a computer graphics system constructed in accordance with the present invention and embodying the dissection units hereof. In general, the figure shows structural blocks which are interconnected by heavy lines that indicate data-flow paths and light lines indicating control signal paths. Control signal paths are provided to interconnect the entire system in association with a control unit 18.

The data signals, representative of the list of polygons is registered in a memory 16, for example, using the format as described above. Of course, the polygons are registered as signal-represented vertices which are drawn from the memory 16 in sequence to be processed. More specifically, the polygons defining objects are defined by vertices or points in the volume V (FIG. 1), which vertices are in turn defined in terms of the coordinates X, Y, and Z. Accordingly, the list sequence may be:

| DATA | SIGNAL FORMAT |
|---|---|
| Object follows | CODE |
| Polygon follows | CODE |
| Vertex P1 | X, Y, Z, W, C, I, F |
| Vertex P2 | X, Y, Z, W, C, I, F |
| . | . |
| . | . |
| Vertex Pn (last) | X, Y, Z, W, C, I, F |
| Polygon follows | CODE |
| Vertex P1 | X, Y, Z, W, C, I, F |
| . | . |
| . | . |
| . | . |

To process the list, the system considers each polygon with respect to a severance plane, separating polygons that are remote from the plane and severing polygons that penetrate the plane into separate polygons. The two fresh lists of polygons then are returned to the memory 16 and registered to reflect the division defined by the severance plane. Subsequently, each of those lists is processed similarly, so that the system functions in an iterative manner to attain the desired final data defining polygons, all of which are visible and properly coded, as for shade and color.

Data signals that are representative of the polygons are provided from the memory 16 in individual sequence through a control unit 18 to an initial polygon dissection unit 20. The dissection unit 20 is connected to supply output signals to two additional dissection units 22 and 24. Generally, the plurality of dissection units enables a plurality of dissections to be accomplished during a single pass of the data signals. Of course, various numbers of units could be provided in a system in accordance with design criteria; however, a favorable situation relates to the use of three units, as in the disclosed embodiment, which is considered in further detail below. As a related point it should be apparent that a single polygon dissection unit could well function in a system, however, would require a pass of the data signals for each dissection that is performed. It is also noteworthy that the dissection units 22 and 24 each have only one output. Consequently, they discard polygons or fragments of polygons that are on one side of the dissection plane (normally the side removed from the viewpoint). Accordingly, the units 22 and 24 may comprise clippers as disclosed in the parent case of which this case is a continuation in part. It should also be appreciated that the dissection unit 20 may take the form of two back-to-back clippers as disclosed in the parent case. In such an arrangement, each of the clippers would preserve what the other discarded. Also, operation could take a re-entrant form as described in the parent case.

The polygon dissection units 22 and 24 are connected by data-flow paths to a pair of surrounder detectors 26 and 28 which are instrumental in the definition of hidden material. That is, as indicated above, when a "surrounder" polygon is found to cover the entire area of a window (fragment of the viewing screen under consideration) then all material behind the polygon will be hidden and can be eliminated from further consideration. Again, polygons which cover an entire area of a window are called "surrounders" because the outline of such a polygon completely surrounds the window. Also, as indicated above, surrounder polygons are relatively easy to detect in the present system because they have no edges which lie within the window boundaries. Consequently, as polygons are dissected, by the units of FIG. 4, those edges coinciding with the dissection plane are identified by a signal Sur as explained above. Signals Sur flag the edge being considered and are provided from the unit 20 to the control unit 18 and in turn to the surrounder detectors 26 and 28. Accordingly, the detectors 26 and 28 simply detect surrounder polygons by checking flag digits and signals Sur for polygons in which all edges are defined to coincide with dissection planes. That is, when a polygon has no edges that do not coincide with the window boundary, it is identified as either a degenerate (reduced to the simplest form) or a surrounder. Surrounders command a dissection along the plane of such a polygon, performed by one of the units 22 or 24 to eliminate data that manifests concealed surfaces.

Continuing with the data-flow description, polygon-representative signals from the detector 26 are passed through an edge selection unit 29 to be returned to the control unit 18 and the memory 16 into a list in development. Somewhat similarly, the detector 28 is connected to an edge selection unit 32 which is in turn connected to the control unit 18.

To consider the operation of the system somewhat more specifically, the polygon dissection unit 20 normally cuts on a plane that passes through the observer's eye E under control of the control unit 18. Such a cut might identify a polygon on one or both sides of the cut, as a surrounder. If so, such a polygon designates a coincident plane with the objective of eliminating any material behind that polygon. The dissection for such elimination is provided by one of the units 22 or 24. In the course of such a dissection, polygons may be severed which penetrate the plane of a surrounder, leaving a newly-cut edge within the window boundary, just as in the case of the internal edge I1-I2 defined between the polygons 10 and 12 in FIG. 1. It is also to be noted that if a surrounder is detected to be behind a previously detected surrounder, the former is eliminated. Somewhat conversely, if a surrounder is detected in front of a previously-located surrounder, the former will replace the latter which is eliminated.

At this stage, a detailed understanding of the operation of the system of FIG. 6 may now best be accomplished by considering the performance of certain predetermined dissections somewhat concurrently with further description of structure. Accordingly, reference will be made to FIG. 6 to consider processing of the data representing the display of FIG. 5.

Reviewing the form of the data, it is to be understood that the memory 16 contains a list of objects which are further defined as surfaces (polygons) which are further defined as edges and which are further defined as vertices by vertex code words. As indicated above, the format for the list may simply involve vertex data words (representative of vertices) that are punctuated to define edges, polygons and objects. A surrounder flag in a vertex word indicates that the edge defined between that, and the preceding vertex, is boundary coincident. Such a flag in the first vertex indicates that the last edge is boundary coincident.

Generally, the list of data in the memory 16 will have been clipped in accordance with the above-referenced parent case hereof so that the polygons are limited to define surfaces that are to be displayed in the field of view that is being formulated. During the processing of the data to that form, an initial dissecting plane for use in the present system is designated. Of course, various criteria for selecting edges may be employed as discussed in detail below; however, assume that the computer control unit 18 has registered the plane I (FIG. 5) to define the initial dissection.

Assume also, for simplification of explanation, that the polygon 12 is initially processed. Accordingly, data definitive of the vertices of the polygon 12 are supplied from the memory 16 to the polygon dissection unit 20 (as described in detail with reference to FIG. 4). The unit 20 provides a stream of vertices to the polygon dissection units 22 and 24 that are definitive of polygons on either side of the dissection plane I. Until the unit 22 or 24 is provided a dissection plane, each simply passes the signals unmodified.

As illustrated in FIG. 5, no polygons appear above the plane I with the result that no vertices are received by the unit 22. However, vertices defining both the forms 10 and 12 are provided to the unit 24. At this stage, the unit 24 is simply an element in the passage for signals back to the memory 16.

Although no surrounder is manifest during the present stage, the signals representative of the second vertex defining the upper edge of polygon 12 receive a flag to indicate coincidence with a dissection plane. Otherwise, signals are passed without alteration through the unit 24, the detector 26 and the unit 29 back to the control unit 18 for return to the memory 16. As a consequence of the initial processing of the list, two lists are provided one of which is void, the other of which defines the polygons 10 and 12 below the dissection plane I.

During the initial data passage, the system selects the second edge to define a dissection plane. Recognizing that several possibilities exist for the selection of dissection planes, in accordance herewith, the plane is selected to coincide with the edge that has the greatest extent in a direction perpendicular to the previous cut. Selection of such an edge is relatively simple because the polygon clipping operation computes the relevant numbers to determine whether each vertex is on one side or the other of the cutting plane. The distances so computed are registered by the edge detection units 29 and 32 which register maximum values for application to the control unit 18 for selecting the next clipping plane. Accordingly, the plane II would define the next dissection.

The list is again processed, resolving that the space to the right of the clipping plane II is void and that the space to the left of the clipping plane contains the entire display. Again, the edge of the polygon 12 coinciding to the clipping plane II is flagged to register that coincidence.

The edge selection unit 29 in cooperation with the control unit 18 next selects the edge to define the clipping plane III and accordingly definitive signals are registered in the dissection unit 20. The operation of processing the polygon 12 along the dissecting plane III results in the fact that all three edges of the polygon 12 are flagged to identify that polygon 12 as a surrounder. As a consequence, the surrounder detector 26 (simply by sensing flags) provides a control signal to the control unit 18 which in turn provides an actuating signal and the plane of the polygon 12 to the polygon dissection unit 24 commanding that unit to dissect all subsequent polygons by dissecting them along the plane of the polygon 12. As a consequence, during the passage of data representative of the polygon 10, the polygon dissection unit 20 defines the visible polygon P1-Q1-Q2-P3 to the unit 22 and polygon Q1-P2-Q2 to unit 24 while the dissection unit 24 puts out the polygon I1-P2-I2.

Considering the dual dissection operation somewhat more specifically, it is initiated after processing the polygon 12, when the vertices definitive of the polygon 10 are provided through the control unit to the polygon dissection unit 20 which registers a plane III to define the first dissection. As a consequence, two polygons are defined, i.e. P1-Q1-Q2-P3 and Q1-P2-Q2. The vertices defining the polygon P1-Q1-Q2-P3 pass unchanged through the unit 22, the surrounder detector 28 and the edge selection unit 32 to the control unit 18 from which that data is placed in a newly-formulated list. However, the signals defining the polygon Q1-P2-Q2 are supplied to the polygon dissection unit 24 which is instructed to process the dissection of the fresh polygon along the plane of the polygon 12. Consequently, a dissection occurs along the plane IV which defines the polygons: Q1-I1-I2-Q2 (hidden) and I1-P2-I2. The polygon dissection unit 24 is instructed to discard material on side B (remote from the viewpoint). Accordingly, only one polygon I1-P2-I2 is provided from the unit 24, which passes through the surrounder detector 26 and the edge selection unit 29 to be returned to memory 16 through the control unit 18. Accordingly, the hidden polygon Q1-I1-I2-Q2 is defined and eliminated, while polygons I1-P2-I2 and P1-Q1-Q2-P3 are registered.

Recapitulating to some extent, it is noteworthy that at the present stage as described, the memory 16 contains two lists. One list defines the polygon 12 and the small polygon 10a. The other list defines the lower portion of the polygon 10, i.e. polygon P1-Q1-Q2-P3. Processing the former list involves dissection along the plane V which is followed by data passes directed to the planes VI and VII. It is to be noted that in finally resolving the polygon 10a, the plane VII is employed at which time the new edge between the vertices I1 and I2 is defined. Thus, it may be seen that as the data is processed, portions which define hidden surfaces are eliminated and edges are reconstructed. Processing the latter list involves dissection on planes VIII, IX and X.

As indicated during the above explanation of operation, several alternatives exist for selecting the next edge to define a dissection plane. The choice of edges to use for dissection planes may materially affect the efficiency of the system. Ideally, an edge should be chosen so as to provide output lists as nearly equal in number of polygons as possible; however, such a selection is generally possible only in retrospect. Accordingly, various geometric criteria may be employed as a basis for selecting edges. As indicated above, the edge to use in the next subdivision is selected by examining each output edge that does not coincide with the window boundary and selecting one for use in the next subdivision operation. If no such edge exists, all polygons must be surrounders and, therefore, the output list can contain only one polygon and requires no further subdividing.

In addition to the criteria as indicated above, for selecting the order of edges to define dissection surfaces, several alternatives are recognized. Specifically, the definitive edge might be selected on the basis of its proximity to the eye E (FIG. 1). Such a criterion tends to select visible edges; however, the technique does not account for the gross features of a picture and may pursue the subdivision process on some insignificant detail. As another alternative, the longest edge may be the basis for selection. This approach advantageously postpones the processing of data directed to minor details; however, it may dissect along hidden edges and, therefore, perform useless processing. Other criteria can be contemplated and may produce satisfactory results.

Another aspect of the operation of the system of FIG. 6 relates to polygons that are definitive of transparent surfaces and the development of representations of shadows on objects. Of course, embodiments of the system can be constructed and effectively used without such capability; however, these facilities are particularly useful in certain applications. The increased capability involves added structures in the form of shade processors 25 and 27. Initially, consider the operation with regard to transparent objects.

Vertex words that specify polygons which represent transparent objects are coded as to indicate transparency in relation to color. Those polygons or parts of such polygons that are determined to lie behind the transparent surface of a polygon are then given a modified coloring code but are preserved in the sorting list. Of course, if the polygon is totally transparent it is totally eliminated.

Referring to FIG. 5, as explained above, the system of FIG. 6 operates to redefine the original polygon P1-P2-P3 as two visible polygons, P1-Q1-Q2-P3 and I1-P2-I2, as well as an obscured polygon Q1-I1-I2-Q2 which is normally dropped from the data lists. However, if the obstructing polygon 12 is somewhat transparent, e.g. an object of blue glass, then the polygon Q1-I1-I2-Q2 remains visible but altered in color. To accomplish that result in processing the data, the dissection operation along the plane of the polygon, which as described above is performed by the polygon dissection unit 24, retains the data indicative of polygon Q1-I1-I2-Q2 with the color code of that polygon somewhat modified.

Relating the process to the system of FIG. 6, the processors 25 and 27 are coupled to receive control signals CU from the control unit 18, and if operative, are also coupled to receive signals representative of a dissected-polygon portion, e.g. polygon Q1-I1-I2-Q2. Specifically, the processor 25 is connected between unit 22 and detector 28 while the processor 27 is connected between unit 24 and detector 28. Concurrently with the control function that renders the units 22 and 24 operative is a control function that also controls the processors 25 and 27, if the polygon that establishes a dissection plane is somewhat transparent. In such a situation, as exemplified in FIG. 5, assuming the polygon 12 is somewhat transparent, the data elements defining the polygon Q1-I1-I2-Q2 are preserved with a color modification. Specifically, as dissection occurs (vertex by vertex) along the plane of the polygon 12 (FIG. 5) the two sub-polygons 10a and Q1-I1-I2-Q2 are developed as explained above. However, rather than the latter being dropped from the data, it passes to the shade processor 27. A color modification code is registered in the processor 27 and is simply added to the code bits representative of color so as to alter the vertex data words defining the polygon Q1-I1-I2-Q2 which are returned to the memory as list elements that will be active in the display. Thus, transparent objects are effectively treated by the system, the representative data being appropriately modified.

The ability of the system to handle transparent surfaces also enables the handling of shadows. A shadow is bounded by several semi-finite planes, each starting at an object edge and extending away from the light source. As one technique, for each edge in the original data, shadow planes are added to the data base. By keeping a count of the number of such planes penetrated before reaching a surface, the system can compute whether the surface is in a shadow. Obviously, shadow planes need be attached only to select external object edges (as seen from the light source) because internal edges will always result in a canceling pair of such planes.

In the system of FIG. 6 as described above, an alternate technique is used. Specifically, the outputs from the polygon clippers 22 and 24 are supplied through the shade processors 25 and 27, respectively, to list registers 30 and 34, respectively To provide shadows in a display, in the first pass, the polygons are designated as being illuminated by light or not illuminated by light. Dissection is then based on the light source being the viewpoint. Instead of discarding those polygons which are not visible (from the light source and thus not illuminated) (or parts thereof), the system designates them to be differently colored or shaded. Consequently, a series of polygons are provided from the shade processors 36 and 38 which are altered in code words to designate shadowed polygons. That list is then processed a second time from the true point of view of the observer. During the second processing step, hidden surfaces are eliminated and those remaining are displayed in a shadowed presentation.

In view of the above consideration, it may be seen that the system of FIG. 6 functions to process signals representative of lists of polygons to accomplish subdivision iteratively until a group of lists are registered in the memory 16 which may be simply and easily displayed. The structure for utilizing such lists in a graphic display is well known in the prior art and, accordingly, is not described herein.

The above description is of a mode of operation that is based on polygons as the units for analysis. Alternatively, the system of FIG. 6 is operative in a mode in which objects are treated. Essentially, the object mode of operation involves defining the silhouettes of objects and eliminating data representative of objects or portions of objects that lie behind the silhouettes. Referring to FIG. 7*a* an object 201 is illustrated in a volume of interest, along with an object 203. A viewpoint 205 is indicated symbolically by an eye and the axis 207 of the viewpoint is indicated by a dashed line. Under the conditions depicted, the object 203 is completely obscured by the object 201. That is, relating a corner 209 of the object 201 to the view from the viewpoint 205 results in a display as shown in FIG. 7*b*. Processing the data therefore involves the elimination of representations of the object 203. More specifically, processing the data involves rejecting all polygons and fragments of polygons that are behind the object 201, i.e. on the side remote from the viewpoint 205 and aligned in the outline 211 (FIg. 7*b*). That elimination is performed by the system of FIG. 6 dissecting polygons first with respect to dissection planes defined by edges of the outline 211, then dissecting the resultant polygons to eliminate polygons and fragments of polygons that lie on the side of the object 201 remote from the viewpoint 205.

Relating the operation to the system of FIG. 6, an initial operation involves defining the silhouette of an object. The edges that define the silhouette have been termed contour edges and have been previously recognized as any edge between a front-facing and a backfacing polygon of a closed polyhedron or any open edge of an open polyhedron. The control unit 18 accordingly has the capability to identify and designate the contour edges of objects as during preliminary processing, e.g. clipping operations. With regard to FIG. 7, the contour edges are indicated in heavy lines and identified as edges 201a, 201b, 201c, 201d, 201e and 201f. These edges, as defined, are selected to define the dissection planes for operation of the polygon dissection unit 20. Upon the detection of an object (contour edges) to be a surrounder, (as described above) a dissection plane for one of the units 22 or 24 is established perpendicular to the viewing axis 107 (Z dimension).

Considering the operation in somewhat greater detail, the edge selection aspects would involve considerations similar to those set out above; however, in any event, in due course the edges 201*a*–201*f* would have all defined coincident clipping planes for the unit 20 that would define polygons and portions of polygons with respect to those edges. When the last of those edges defines the dissection plane that is registered in the polygon dissection unit 20, the object 201 is sensed as a surrounder object, i.e. an object that has no contour edge inside the presently-defined window. That fact provides the basis for eliminating all polygons that are behind the surrounder object. Accordingly, the polygon dissection units 22 and 24 are given a dissection plane coinciding to the rear-most point 213 (FIG. 7*a*) for eliminating data that is definitive of material falling behind the surrounder object as explained. The result is that all objects and portions of objects that are obscured by the silhouette of contour edges 201a-201f are eliminated from the polygon-defining data.

Of course, the operation of the system as described above requires some modification for the control unit 18 from the previously described polygon mode of operation. However, shade processing, transparency and other processing related to the system are clearly fully applicable to either mode of operation. Also, it is noteworthy that a processing sequence may well involve both the polygon mode and the object mode. For example, should an object be found to surround a window and the conservative depth test not eliminate all other polygons, further subdivision will be required. In this case, subdivision along non-contour edges may be required, much like that used in the simple hidden-surface algorithm. At each stage, of course, the remnants of the surrounding object may prove to obscure the remaining material, based on a depth test which becomes more discriminating as fewer and fewer vertices are included in the window. In the worst case, the algorithm reduces to the simple hidden-surface algorithm in the region of conflicting objects. Actual penetration can be resolved as in the simple algorithm when single surrounding polygons are reached.

From the above, it can be seen that embodiments of the system can be variously utilized to effectively process space-related data. The system has a particularly advantageous application in the computer-graphics field; however, other applications are somewhat apparent. Specifically, the system has application for the solution of problems in such fields as radar shadowing, nuclear radiation, illumination computations, plus the sorting aspects suggest applications aimed at detecting conflicting volumes in spacial plans, e.g. complex pipe layouts. Accordingly, the scope hereof is as defined by the following claims.

What is claimed is:

1. A method for processing data in relation to a volume of space comprising the steps of:

representing data in the form of electrical signals manifesting objects and positional relationships of said objects in said volume of space;

defining a selected viewpoint in relation to said volume of space;

selectively defining a specific plane in terms of electrical signals, from various possible planes lying in said volume of space, said specific plane being related to one of said objects, said possible planes including planes extending transverse to the axis of said selected viewpoint; and testing said electrical signals manifesting objects and positional relationships of said objects in said volume of space in relation to said specific plane to generate signals that are definitive of data representing said objects on each side of said specific plane.

2. A method wherein each of the steps of claim 1 is progressively repeated in sequence to provide display electrical signals defining select portions of said objects.

3. A method according to claim 1 wherein said electrical signals represent vertex locations defining polygons.

4. A method according to claim 1 wherein said plane in said volume of space is defined coincident with an edge of one of said objects.

5. A method according to claim 4 further including the steps of: representing the opacity of said objects with opacity electrical signals and modifying said signals definitive of data representing said objects on each side of said specific plane in accordance with said opacity electrical signals.

6. A data processing system comprising:

means for providing sets of electrical signals representative of positional vertices definitive of polygons in space;

first means for registering one set of said sets of electrical signals;

second means for registering representations definitive of a plane in said space;

processing means connected to receive signals from: said means for providing signals definitive of polygons in space, said first register means and said second register means, for processing said one set of electrical signals with another set of said sets of electrical signals provided from said means for providing, subsequent to said one set, to provide separate developed sets of electrical signals representative of vertices sorted with respect to said plane in said space, said processing means including a pair of output means for individually receiving said signals representative of vertices sorted with respect to said plane.

7. A system according to claim 6 and further including selection means to specify a series of said representations definitive of planes to define progressively smaller volumes for said positional vertices.

8. A system according to claim 7 further including means for detecting coincidence of a boundary of one of said volumes and one of said polygons for controlling said selection means.

9. A system according to claim 8 wherein said first register means includes means to register signals indicating that one of said polygons is definitive of a silhouette of an object.

* * * * *